Patented Mar. 14, 1933

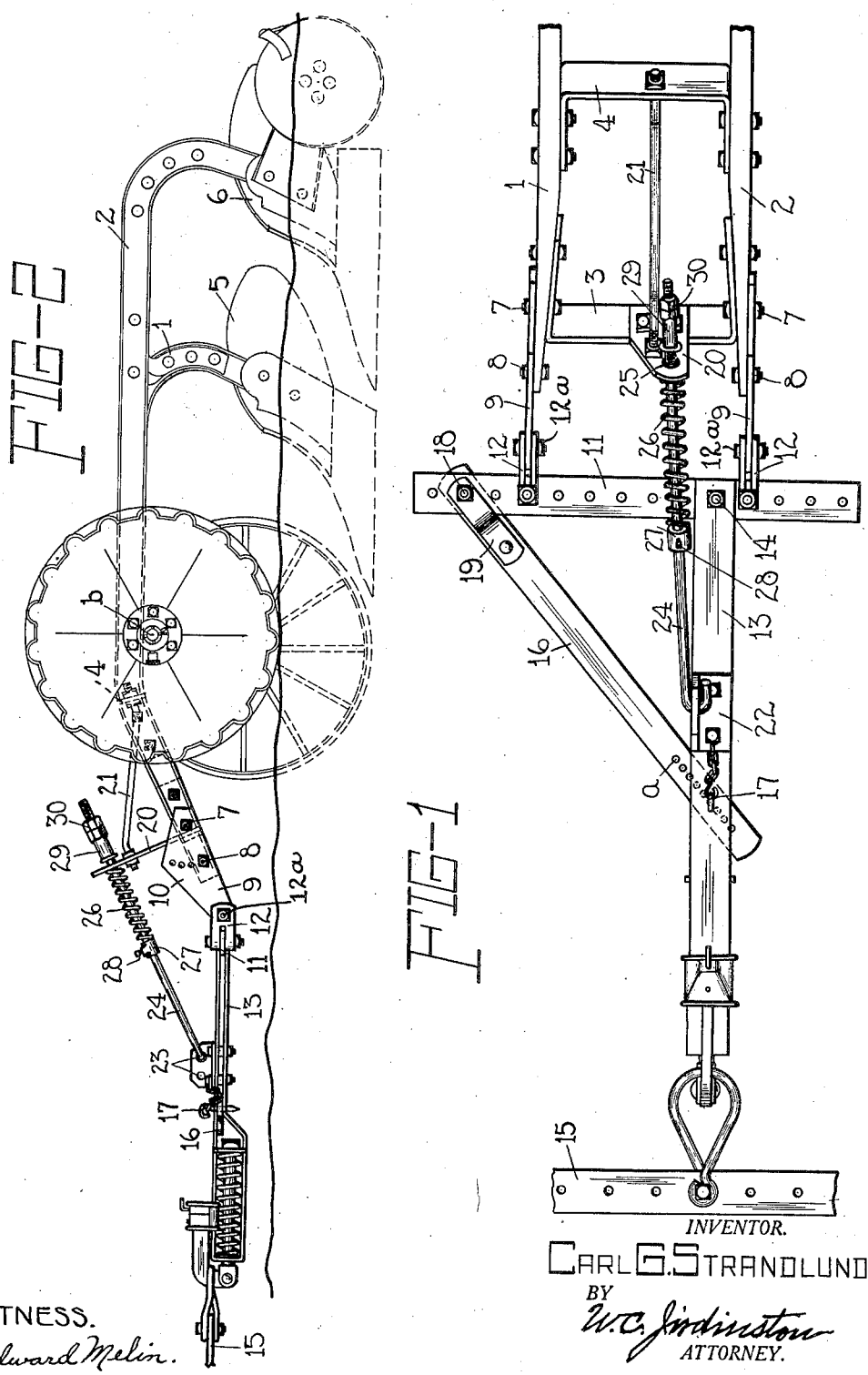

1,901,134

UNITED STATES PATENT OFFICE

CARL G. STRANDLUND, OF MOLINE, ILLINOIS, ASSIGNOR TO DEERE & COMPANY, OF MOLINE, ILLINOIS, A CORPORATION OF ILLINOIS

AUTOMATIC DEPTH CONTROL FOR PLOWS

Application filed October 5, 1931. Serial No. 566,925.

My invention relates to tractor drawn wheel plows and more particularly to those which are drawn through a relatively long draft member pivotally connected to the tractor at one end and to the plow frame at the other, and wherein the supporting wheels are positioned near the plow bottoms and a substantial distance from the forward end of the plow frame. In plows of this type it is necessary that the point of pivotal connection of the draft member with the plow frame be in or near the line of draft which is the line connecting the point of pivotal connection of the draft member to the tractor with the center of resistance of the load. If the point of pivotal connection of the draft member with the plow frame is substantially above the line of draft, the component of the draft at right angles to the line of draft becomes of sufficient magnitude a cause a rocking movement of the plow frame about the axes of the supporting wheels and a rising of the rear end of the plow frame. This seriously affects the proper operation of the plow and results in an uneven surface of the furrow bottom.

Since a certain amount of clearance is necessarily required underneath the draft member throughout its full length, especially when operating in stony or trashy field conditions, it is not always possible to connect the draft member with the plow frame at a point lying in the draft line or even close to it. In such circumstances the draft member must be connected to the plow frame at a point considerably above the line of draft with the result that what is considered a good job of plowing cannot be accomplished with the above type of plow.

By my invention I have devised a mechanism which may be connected between the plow frame and the draft member and which functions to counterbalance the component of the draft force perpendicular to the line of draft. The tendency of the plow to rock about the axes of its supporting wheels, or the rear end of the plow to rise, is thus eliminated. By the use of this mechanism, therefore, it is feasible to connect the draft member at a point considerably above the line of draft, as is very desirable for clearance purposes, without the undesirable operating characteristics ordinarily resulting from such connection prevailing.

The object of my invention may therefore be stated as being the provision of means for counterbalancing the component of the draft force perpendicular to the line of draft existing when the draft member is pivotally connected to the plow frame at a point substantially above the line of draft.

Another object of my invention is the provision of means in a wheel plow for counteracting the tendency of the plow to rock about the axes of the supporting wheels, and the rear end of the plow to rise under the force of the draft existing when the draft member is pivotally connected to the plow frame at a point substantially above the line of draft. The manner in which these objects and other objects are accomplished is disclosed in the following specification.

Referring to the drawing in which similar numerals indicate identical parts—

Figure 1 is a side elevation of a wheeled plow embodying my device and showing the plow in the ground; and, Figure 2 is an enlarged plan view of my device as attached to the forward part of the plow and to the tractor drawbar.

The frame of the plow consists of the plow beams 1 and 2 having their forward portions bent to extend forwardly downward; the beams are spaced apart by transverse bars 3 and 4, the bar 4 being located at the bend of the beams, and the bar 3 being located intermediate the bend of the beams and their forward terminations. Both bars are rigidly bolted to the beams 1 and 2. Plows 5 and 6 are mounted on the beams 1 and 2, respectively, and land and furrow wheels and a rear wheel (the latter not shown) support the structure. To the forward ends of the beams 1 and 2 are secured by bolts 7 and 8 beam clevises 9 which are adjustable in that they can be swung on the bolt 7 and secured in a new position by the bolt 8 in either of several holes 10 in the clevises. Draft is applied to the frame of the plow through a draft member comprising a drawbar 11, a hitch bar 13 and brace bar 16. The drawbar 11 is attached to the clevises 9 by shackles 12, which in turn are pivoted to clevises 9 at 12a by means of pivot bolts. The hitch bar 13 is formed preferably of a single bar bent upon itself with its ends attached to the drawbar 11 by a vertical bolt 14. The forward end of the hitch bar is provided with a well-known type of relief tripping device and is connected to the tractor drawbar 15. The brace bar 16 is connected to the hitch bar by a pin 17 inserted in holes in the hitch bar 13 and the brace bar, the latter being provided with a plurality of holes a in any one of which the pin 17 can be inserted for purposes of adjustment of the brace bar or the hitch bar. The opposite end of the brace bar 16 extends diagonally to the under side of the furrowward end of the drawbar 11 and is attached thereto by a bolt 18; a strap 19 is riveted to the bar 16 and is secured to the top of said bar by the same bolt that secures the bar in place.

A bracket 20 is bolted to the transverse bar 3, and extends upwardly and forwardly and is stayed by a rod 21 bolted to the upper part of the bracket and extending to the transverse bar 4 where it is also secured. A bracket 22 is mounted on the hitch bar 13 and is provided with a plurality of holes 23 in the rear one of which is hooked a rod 24 extending rearwardly and upwardly and projecting through a hole 25 in bracket 20 in which it is movable longitudinally. A coiled spring 26 on the rod 24 operates between the bracket 20 and a collar 27 longitudinally adjustable on the rod 24 and secured at any point of adjustment by a set screw 28. The end portion of the rod 24, rearward of the bracket 20, is threaded and mounted on it is a sleeve 29 having its rear end hexagon shaped and threaded internally for adjustment of the sleeve which is held in place by a jam nut 30 on the rod.

With the plow set to operate to the depth shown in Figure 2 and with the clevises 9 set as shown in this figure to give the desired clearance under the draft member, the point 12a, the point of pivotal connection of the draft member with the frame, is considerably above the line of draft which is the line drawn from the point of pivotal connection of the draft member to the drawbar 15 with the center of resistance of the load which lies below the surface of the ground and substantially midway between the two plow bodies 5 and 6. As a result, the force of the draft has a considerable downward component tending to rotate the frame of the plow about the axes of its carrying wheels in a counter-clockwise direction, looking at Figure 2; or, stated in other words, tending to raise the rear end of the plow upwardly. Spring 26, however, is set under a compression sufficient to counterbalance the component of the force of the draft tending to cause this rocking movement of the frame. As a result spring 26 effectively eliminates the tendency of the rear end of the frame to rise which would otherwise exist with the draft member connected to the frame at a point above the line of draft. Lateral adjustment of the hitch bar 13 and the brace bar 16 on the drawbar 11 is provided for by a series of holes in the drawbar 11 which is also laterally adjustable on the frame bars 9; such adjustments in no way affecting the operation of my device in resisting with a varying pressure a vertical movement of the rear end of the plow when the plow is in operation.

What I claim is:—

1. The combination with a wheeled plow, of a hitch device pivotally attached thereto and to a tractor, and means attached to the plow and to the hitch device operating to resist a vertical movement of the rearward end of the plow.

2. The combination with a wheeled plow, of a hitch device pivotally connected to the plow and to a tractor, and means attached to the plow and to the hitch device operating to resist with increasing pressure a vertical movement of the rearward end of the plow.

3. The combination with a wheeled plow, of a hitch device pivotally connected to the plow and to a tractor, and means attached to the plow and to the hitch device operating with a varying pressure to resist a vertical movement of the rearward end of the plow.

4. The combination with a wheeled plow, of a hitch device pivotally connected to the plow and to a tractor, means to adjust the hitch device laterally relative to the plow and tractor, and means attached to the plow and to the hitch device operating with a varying pressure to resist a vertical movement of the rearward end of the plow irrespective of the lateral adjustment of the hitch device.

5. The combination with a wheeled plow, of a hitch device pivotally connected to the plow and to a tractor, means to adjust the hitch device laterally relative to the plow and tractor, and means attached to the plow and to the hitch device operating against a vertical movement of the rear end of the plow irrespective of the lateral adjustment of the hitch device.

6. The combination with a wheeled plow including a frame, of a drawbar mounted on the frame, a hitch device pivotally attached to the drawbar and to a tractor, a rod pivotally connected to the hitch device and extending to a support on the frame in which it is supported longitudinally movable, a collar on said rod intermediate said support and hitch device, and a coiled spring on the rod compressed between said support and collar.

7. The combination with a wheeled plow including a frame, of a drawbar mounted transversely on the frame, a hitch device including a hitch bar pivotally attached to the drawbar and to a tractor, a bracket on the hitch bar, a rod connected to said bracket and extending rearwardly, a bracket on the frame having an opening through which said rod passes and is longitudinally movable, a sleeve secured on the rearward end of said rod so as to leave a space between the frame and the bracket thereon, a collar on said rod intermediate said brackets and a coiled spring on the rod between said collar and frame bracket.

8. The combination with a wheeled plow including a frame, of a drawbar mounted on the frame; a hitch device pivotally attached to the drawbar and to a tractor, a rod pivotally connected to the hitch device and extending to a support on the frame in which it is supported and longitudinally movable, a collar on said rod intermediate said support and hitch device, a coiled spring on the rod compressed between said support and collar, and means to secure said collar to varying positions on the rod to compress said spring against the support or allow it to expand.

9. A plow comprising a frame, a pair of wheels supporting the frame and spaced from the front end thereof, a draft member pivotally connected to the front end of the frame and adapted to be pivotally connected to pulling means, and means connected between the draft member and the plow frame for yieldingly counteracting the component of the draft force perpendicular to the line of draft.

10. A plow comprising a frame, a pair of wheels supporting the frame and spaced from the front end thereof, a draft member pivotally connected to the front end of the frame and adapted to be pivotally connected to pulling means, and means connected between the draft member and the plow frame for yieldingly resisting forward rocking movement of the frame about the axes of said wheels.

CARL G. STRANDLUND.